(12) United States Patent
Jang et al.

(10) Patent No.: US 12,139,029 B2
(45) Date of Patent: Nov. 12, 2024

(54) VEHICLE BATTERY CHARGING SYSTEM AND CHARGING METHOD USING THE SAME

(71) Applicants: Hyundai Motor Company, Seoul (KR); Kia Corporation, Seoul (KR)

(72) Inventors: Young Jin Jang, Seoul (KR); Sung Hwan Kim, Gyeonggi-do (KR); Won Yong Sung, Gyeonggi-do (KR); Dong Jun Lee, Gyeonggi-do (KR); Hye Seung Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 512 days.

(21) Appl. No.: 17/509,737

(22) Filed: Oct. 25, 2021

(65) Prior Publication Data

US 2022/0194238 A1    Jun. 23, 2022

(30) Foreign Application Priority Data

Dec. 23, 2020    (KR) .................. 10-2020-0182467

(51) Int. Cl.
*B60L 53/22*    (2019.01)
*B60L 8/00*    (2006.01)
*B60L 50/60*    (2019.01)

(52) U.S. Cl.
CPC .............. *B60L 53/22* (2019.02); *B60L 8/003* (2013.01); *B60L 50/60* (2019.02)

(58) Field of Classification Search
CPC ...................................... B60L 53/22
USPC ...................................... 320/128
See application file for complete search history.

(56) References Cited

U.S. PATENT DOCUMENTS

| | | | |
|---|---|---|---|
| 9,300,148 B2 | 3/2016 | Oh et al. | |
| 2012/0235626 A1 | 9/2012 | Oh et al. | |
| 2013/0320911 A1* | 12/2013 | Kamiya | B60L 53/22 320/101 |
| 2016/0075243 A1* | 3/2016 | Okumura | H02J 7/16 318/139 |
| 2017/0166079 A1* | 6/2017 | Saucke | H02J 7/35 |
| 2018/0154794 A1* | 6/2018 | Hsiao | B60L 7/16 |
| 2018/0297476 A1* | 10/2018 | Malek | B60L 1/003 |

(Continued)

FOREIGN PATENT DOCUMENTS

| | | | | |
|---|---|---|---|---|
| KR | 10-1229441 B1 | | 2/2013 | |
| KR | 20200068410 A | * | 6/2020 | ............... B60L 8/00 |
| KR | 20200124033 A | | 11/2020 | |

*Primary Examiner* — Jerry D Robbins
(74) *Attorney, Agent, or Firm* — Fox Rothschild LLP (57) ABSTRACT

A vehicle battery charging system includes a main battery, an auxiliary battery, an integrated converter that includes a high voltage charging device that supplies power to the main battery and a low voltage charging device that supplies power to the auxiliary battery, a solar cell that converts sunlight into electrical energy, a solar cell converter that converts an output of the solar cell into a voltage corresponding to a voltage of the auxiliary battery and outputs the converted voltage to the auxiliary battery, and a switching device that switches between the integrated converter and external power and the integrated converter and the solar cell, wherein the switching device connects the integrated converter and the solar cell in a solar cell only charging mode in which the auxiliary battery is charged by the solar cell.

18 Claims, 7 Drawing Sheets

(56) References Cited

U.S. PATENT DOCUMENTS

2020/0247258 A1\* 8/2020 Park ................. B60L 53/51
2020/0338990 A1 10/2020 Jang et al.

\* cited by examiner

VEHICLE BATTERY CHARGING SYSTEM AND CHARGING METHOD USING THE SAME

CROSS-REFERENCE TO RELATED APPLICATION

This application claims under 35 U.S.C. § 119(a) the benefit of Korean Patent Application No. 10-2020-0182467, filed in the Korean Intellectual Property Office on Dec. 23, 2020, the entire contents of which are incorporated herein by reference.

BACKGROUND

(a) Technical Field

The present disclosure relates to a vehicle battery charging system and a vehicle battery charging method.

(b) Description of the Related Art

Recently, in addition to an eco-friendly vehicle that generates power by driving a motor using electric energy, research on a vehicle equipped with a solar cell that generates electric power by converting sunlight into electric energy has been actively conducted.

A typical eco-friendly vehicle may include a high-voltage battery for storing electric energy for driving a motor, an auxiliary battery for supplying power to an electric load of a vehicle, and an on-board charger (OBC) that down-converts a voltage of the high-voltage battery to provide charging power for the auxiliary battery or power to the electric load. In addition, a solar cell system provided in the eco-friendly vehicle may supply power generated by a solar cell to charge the auxiliary battery or the high voltage battery.

In an eco-friendly vehicle equipped with a solar cell system, the high voltage battery or the auxiliary battery may be charged through various paths, and the charging path of the high voltage battery or the auxiliary battery may include several power converters for converting charging power into an appropriate strength.

When a battery is charged using a conventional solar cell system, resonance of an FET-side parasitic capacitor of an OBC output terminal and a transformer inductor may occur, thereby causing a phenomenon in which an OBC link capacitor is continuously charged. To prevent this, a relay or the like may be used, but this structure may be accompanied by a decrease in OBC efficiency.

Accordingly, there is a need to provide a battery charging system capable of preventing a link capacitor from being charged without degrading efficiency of an OBC.

SUMMARY

An aspect of the present disclosure provides a vehicle battery charging system capable of preventing a link capacitor from being charged without degrading OBC efficiency and a method using the same.

Another aspect of the present disclosure provides a vehicle battery charging system capable of replacing a high-sensitivity detection cell (HSDC) using a bidirectional OBC and a method using the same.

Still another aspect of the present disclosure provides a vehicle battery charging system capable of solving a link voltage overcharge problem that may occur due to an integrated transformer structure by utilizing a solar loop power structure, and a method using the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for charging a vehicle battery includes a main battery, an auxiliary battery, an integrated converter that includes a high voltage charging device that supplies power to the main battery and a low voltage charging device that supplies power to the auxiliary battery, a solar cell that converts sunlight into electrical energy, a solar cell converter that converts an output of the solar cell into a voltage corresponding to a voltage of the auxiliary battery and outputs the converted voltage to the auxiliary battery, and a switching device that switches between the integrated converter and external power and the integrated converter and the solar cell, wherein the switching device connects the integrated converter and the solar cell in a solar cell only charging mode in which the auxiliary battery is charged by the solar cell.

A current, which is caused by a charging voltage of a link capacitor in the integrated converter generated when the auxiliary battery is charged by the high voltage charging device, may flow to the auxiliary battery through the solar cell converter when the switching device connects the integrated converter and the solar cell.

The integrated converter may include a power converting device that includes a common transformer and divides and converts the power input using the common transformer into a first voltage for charging the main battery and a second voltage for charging the auxiliary battery, and a power factor correction (PFC) device that corrects a power factor of the external power, wherein the PFC device performs discharge through a buck control when a current flow to the auxiliary battery through the solar cell converter is generated.

In the solar cell only charging mode, a transport current may be generated by an inductor resonance phenomenon of a parasitic capacitor of the power converting device and the common transformer, and the transport current may cause a charging voltage of a DC link capacitor between the power converting device and the PFC device.

A current obtained by subtracting a charging current of the solar cell from an optimal efficiency input current of the solar cell converter may be output from the PFC device.

A charging current of the solar cell may be charged into the main battery through the high voltage charging device when the auxiliary battery is fully charged.

The PFC device may perform charging through a boost control when a current flow to the main battery through the high voltage charging device is generated.

The switching device may connect the integrated converter and a grid for supplying the external power in an OBC charging mode in which the auxiliary battery is charged by the integrated converter.

A charging current of the solar cell may be charged into the auxiliary battery in the OBC charging mode.

A charging current of the solar cell may be prevented from being charged into the main battery in the OBC charging mode.

According to another aspect of the present disclosure, a method of charging a vehicle battery includes determining, by a controller, a charging mode of a vehicle battery charging system; and controlling, by the controller, a switching device to connect an integrated converter and a solar cell when the charging mode is a solar cell only charging mode in which an auxiliary battery is charged by the solar cell.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used In this casein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 6.

Figure 1:
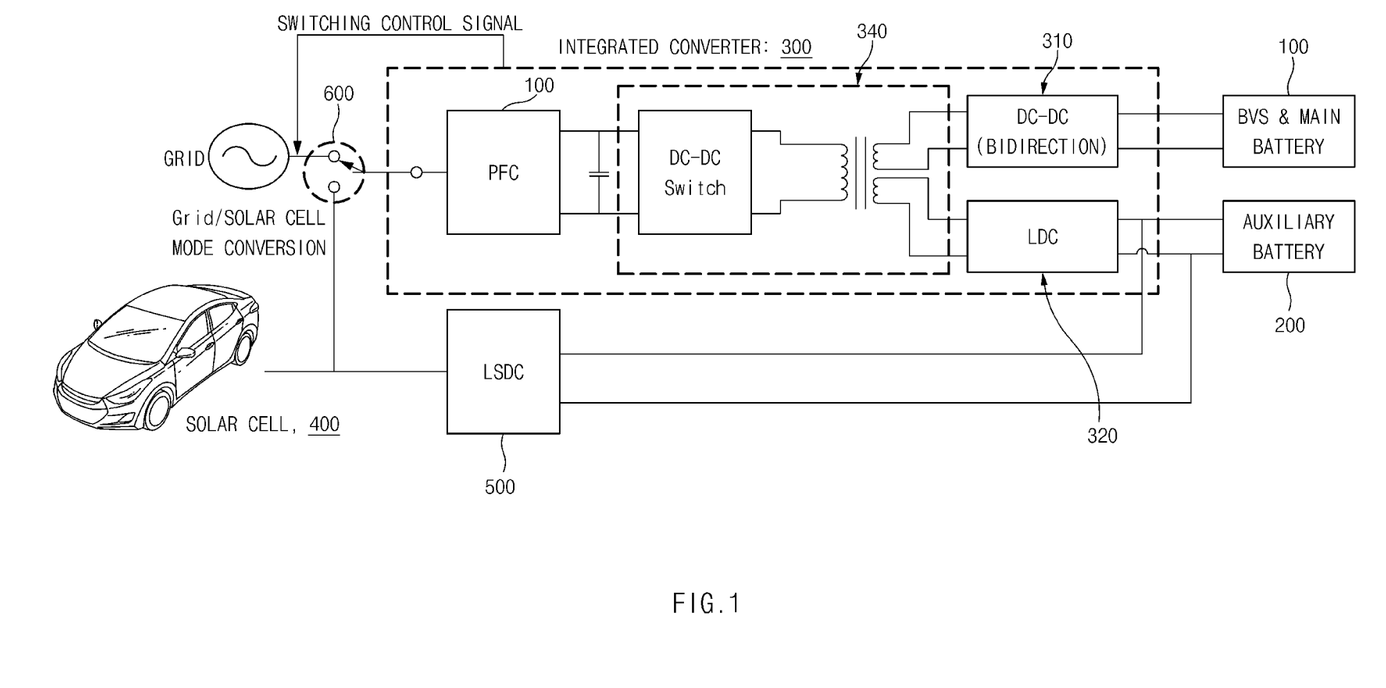
FIG. 1 is a circuit diagram of a vehicle battery charging system according to an embodiment of the present disclosure.

FIG. 1 is a circuit diagram of a vehicle battery charging system according to an embodiment of the present disclosure.

A vehicle battery charging system according to an embodiment of the present disclosure may be installed in an electric vehicle (EV), a plug-in hybrid electric vehicle (PHEV), and the like, convert AC power to a high voltage to charge a high-voltage battery, that is, a main battery, and convert the AC power into an auxiliary voltage to charge the auxiliary battery. The charged main battery may be used as a power source for an electric vehicle or a plug-in hybrid vehicle, and the auxiliary battery may be used for driving various electronic control units installed in the vehicle, such as an electronic control unit for a brake system, an electronic control unit for a suspension system, an electronic control unit for a steering system, and the like.

As shown in FIG. 1, a vehicle battery charging system according to an embodiment may include a main battery 100, an auxiliary battery 200, an integrated converter 300 for supplying power to the main battery 100 and the auxiliary battery 200, a solar cell 400 for converting light into electrical energy, a solar cell converter 500, and a switching device 600.

The vehicle battery charging system may further include a controller that detects the charging states of the main battery 100 and the auxiliary battery 200, and outputs a control signal for controlling the switching device 600 corresponding to the charging mode.

The main battery 100 which is a device for storing high-voltage electric energy to be provided to a motor (not shown) that produces power for a vehicle, and the auxiliary battery 200 which is a battery having a relatively small voltage compared to the main battery 100 may be connected to an output terminal of the solar cell converter 500 and the integrated converter 300.

The integrated converter 300 according to the present embodiment may include a high voltage charging device 310 for supplying power to the main battery 100 and a low voltage charging device 320 for supplying power to the auxiliary battery. In addition, the integrated converter 300 may include a common transformer, and may further include a power converting device 340 that divides input power into a first voltage for charging the main battery 100 and a second voltage for charging the auxiliary battery 200 by using the common transformer, and a power factor correction (PFC) device 350 that corrects a power factor of external power.

The power converting device 340 may charge the main battery 100 with external power, such as a smart grid, according to charging control received from a battery management system (BMS) installed in the vehicle, and the integrated transformer may have respective secondary windings having respective turns ratios corresponding to power conversion of the high voltage charging device 310 and the low voltage charging device 320.

The high voltage charging device (DC-DC (bidirectional)) 310 charges the main battery 100 by stepping down the first voltage converted by the power converting device 340, and the low voltage charging device (LDC) 320 charges the auxiliary battery 200 by stepping down a second voltage of the power converting device 340.

The low voltage charging device 320 is connected to the power converting device 340 and the high voltage charging device 310, and converts the high voltage DC power of the power converting device 340 and the high voltage charging device 310 into a low voltage and outputs the low voltage. The low voltage charging device 320 may be implemented by employing a topology of various DC-DC converters known in the art.

According to the related art, the charging system has a structure in which the auxiliary battery is preferentially charged through the solar cell, and the main battery is limitedly charged only when the auxiliary battery is fully charged. However, the HSDC for charging the main battery by using a solar cell does not particularly contribute to the improvement of the charging efficiency because its use is not very frequent. That is, a structure for charging a high voltage battery using an on-board charger (OBC), that is, the main battery, is much more efficient than a separate module for charging the main battery.

The integrated converter 300 according to the present embodiment has a structure including both the high voltage charging device 310 and the low voltage charging device 320, and the charging of the main battery 100 by the solar cell 400 may be also performed through the high voltage charging device 310. Such a charging structure may be expressed as an integrated OBC-LDC structure, and the link voltage overcharge problem occurring in the transformer due to the integrated OBC-LDC structure may be solved by using a solar loop power structure.

The solar cell 400 is a component for converting light energy such as sunlight into electrical energy. The solar cell 400 may be installed at a position suitable for receiving light, such as a roof of a vehicle, and the like. Because the output of the solar cell 400 may be changed corresponding to the amount of light received, the output of the solar cell 400 may be monitored by a controller (not shown). In addition, although not shown, a voltage sensor and a current sensor may be installed at an output terminal of the solar cell 400, and the controller may calculate the output of the solar cell 400 based on the detection values of the voltage and current sensors, thereby monitoring the output of the solar cell 400.

The solar cell converter (LSDC) 500 may convert the output of the solar cell 400 into a voltage corresponding to the voltage of the auxiliary battery 200 to output the converted voltage to the auxiliary battery 200, and according to an example, the solar cell converter 500 may be provided in plural.

In addition, the battery charging system according to the present embodiment may further include the switching device 600 for switching between the integrated converter 300 and external power (grid) and between the integrated converter 300 and the solar cell.

The switching device 600 may control to connect the integrated converter 300 to the grid or the solar cell 400 according to whether the auxiliary battery 200 is charged by the solar cell 400 alone rather than the integrated converter 300, that is, according to the charging mode in which the auxiliary battery 200 is charged.

According to an example, in a solar cell only charging mode in which the auxiliary battery 200 is charged by the solar cell 400 rather than the integrated converter 300, the switching device 600 may connect the integrated converter 300 and the solar cell 400. Hereinafter, the operation of the switching device 600 corresponding to the charging mode will be described.

Figure 2:
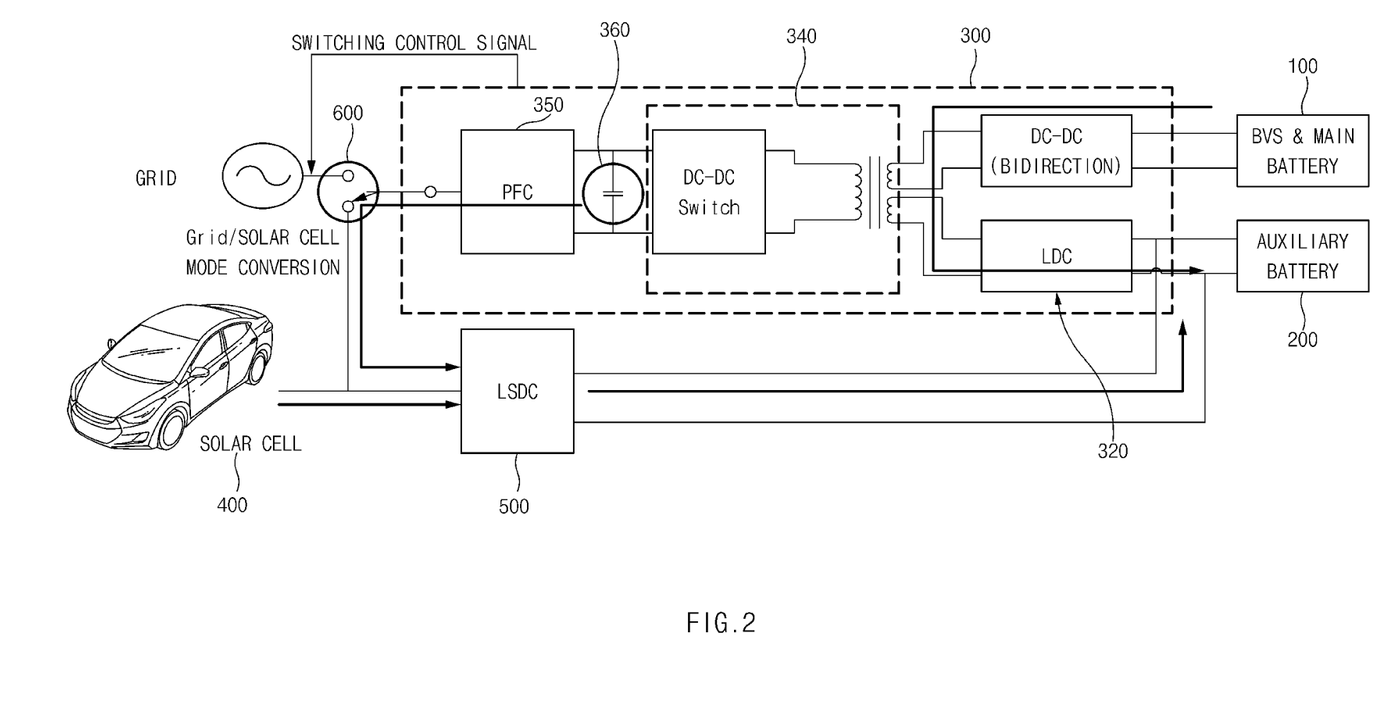
FIG. 2 is a view illustrating a vehicle battery charging system in a solar cell only charging mode according to an embodiment of the present disclosure.

FIG. 2 is a view illustrating a vehicle battery charging system in a solar cell only charging mode according to an embodiment of the present disclosure.

As described above, in the solar cell only charging mode in which the auxiliary battery 200 is charged only by the solar cell 400, that is, when the auxiliary battery 200 is charged only by the solar cell 400 rather than the integrated converter 300, the switching device 600 connects the integrated converter 300 and the solar cell 400.

When the switching device 600 connects the integrated converter 300 and the solar cell 400, the current caused by the charging voltage of the high voltage charging device 310 may flow through the solar cell converter 500 into the auxiliary battery 200. That is, when the auxiliary battery 200 is charged by the high voltage charging device 310, the current caused by the charging voltage of a link capacitor in the integrated converter 300 may flow into the auxiliary battery 200 through the solar cell converter 500. As described above, when a current flow to the auxiliary battery 200 through the solar cell converter 500 is generated, the PFC device 350 performs discharge through buck control.

In the solar cell only charging mode, a transport current may be generated by an inductor resonance phenomenon of an FET parasitic capacitor in the power converter 340 and the transformer, so that a DC link capacitor 360 is continuously is charged even in the solar cell only charging mode. Such overcharging of the DC link capacitor 360 may cause damage to the capacitor.

In the present embodiment, by forming a path through which the charged current is conducted toward the solar cell converter 500, the DC link capacitor 360 may be discharged. The switching device 600 may generate a transport path in the direction of the auxiliary battery 200 through the solar cell 400, that is, the solar cell converter 500, so that capacitor overcharging may be prevented, thereby preventing damage to the capacitor.

According to the related art, a separate relay connected to the capacitor is added to prevent overcharging of the OBC link capacitor, so that the OBC efficiency is reduced when charging the auxiliary battery due to the addition of the relay.

Meanwhile, when a discharge path is generated using a bidirectional OBC and the solar loop as shown in FIG. 2, the overcharge phenomenon in which the link capacitor is charged may be prevented.

In addition, because it is possible to assist the current load of the solar cell converter 500 by such a discharge current, the input current may be adjusted even when the amount of light is insufficient.

Meanwhile, the amount of current discharged from the integrated converter 300 to the solar cell converter 500 is changed depending on the solar cell current generation amount and light amount in order to maximize the converter efficiency of the LSDC.

The amount of current generated by the solar cell 400 may vary depending on the weather, and the solar cell converter 500 may be a converter having the maximum efficiency at a specific amount of input current.

Figure 3:
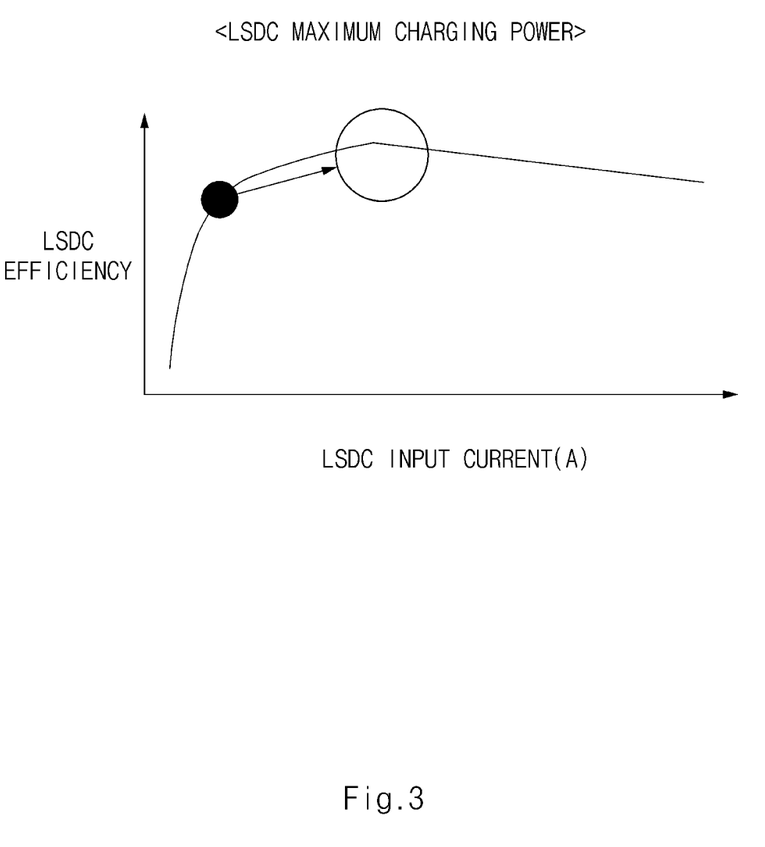
FIG. 3 is a view illustrating the efficiency of an LSDC according to an embodiment of the present disclosure.

FIG. 3 is a view illustrating the efficiency of an LSDC according to an embodiment of the present disclosure.

As shown in FIG. 3, the maximum efficiency of the solar cell converter 500 may vary at a specific amount of input current, and the amount of current input from the solar cell 400 may vary depending on an amount of light.

Therefore, the current output from the PFC device 350, that is, the amount of discharge may be the current obtained by subtracting the charging current of the solar cell 400 from the optimal efficiency input current of the solar cell converter 500.

That is, the PFC device 350 may output a reverse current capable of preventing the DC capacitor from being overcharged while maintaining the maximum charging efficiency of the solar cell converter 500.

Figure 4:
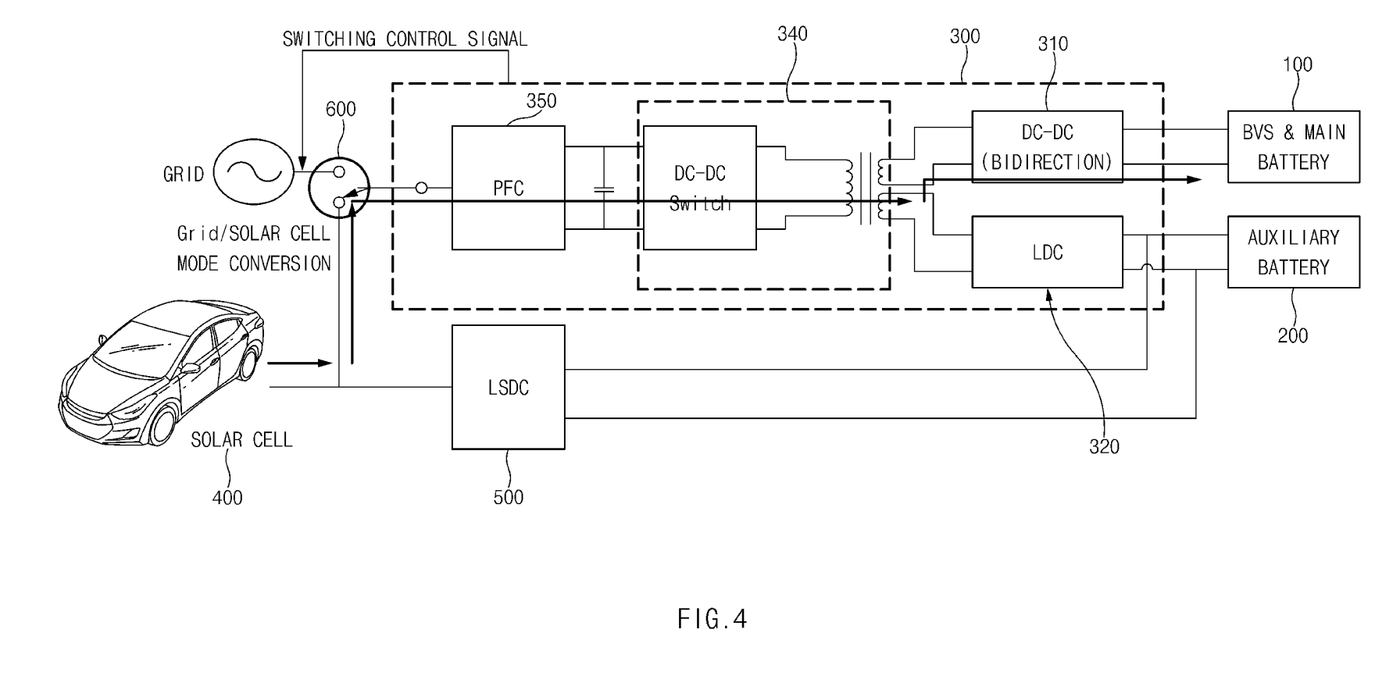
FIG. 4 is a view illustrating a vehicle battery charging system when an auxiliary battery is fully charged according to an embodiment of the present disclosure.

FIG. 4 is a view illustrating a vehicle battery charging system when an auxiliary battery is fully charged according to an embodiment of the present disclosure.

As shown in FIG. 4, when the auxiliary battery 200 is fully charged, the energy charged in the solar cell 400, that is, the charging current may charge the main battery 100 through the high voltage charging device 310.

That is, when the energy charged in the solar cell 400 is charged to the main battery through the integrated converter 300, and a current flow is generated to the main battery 100 through the high voltage charging device 310, the PFC device 350 may perform charging by boost control.

Figure 5:
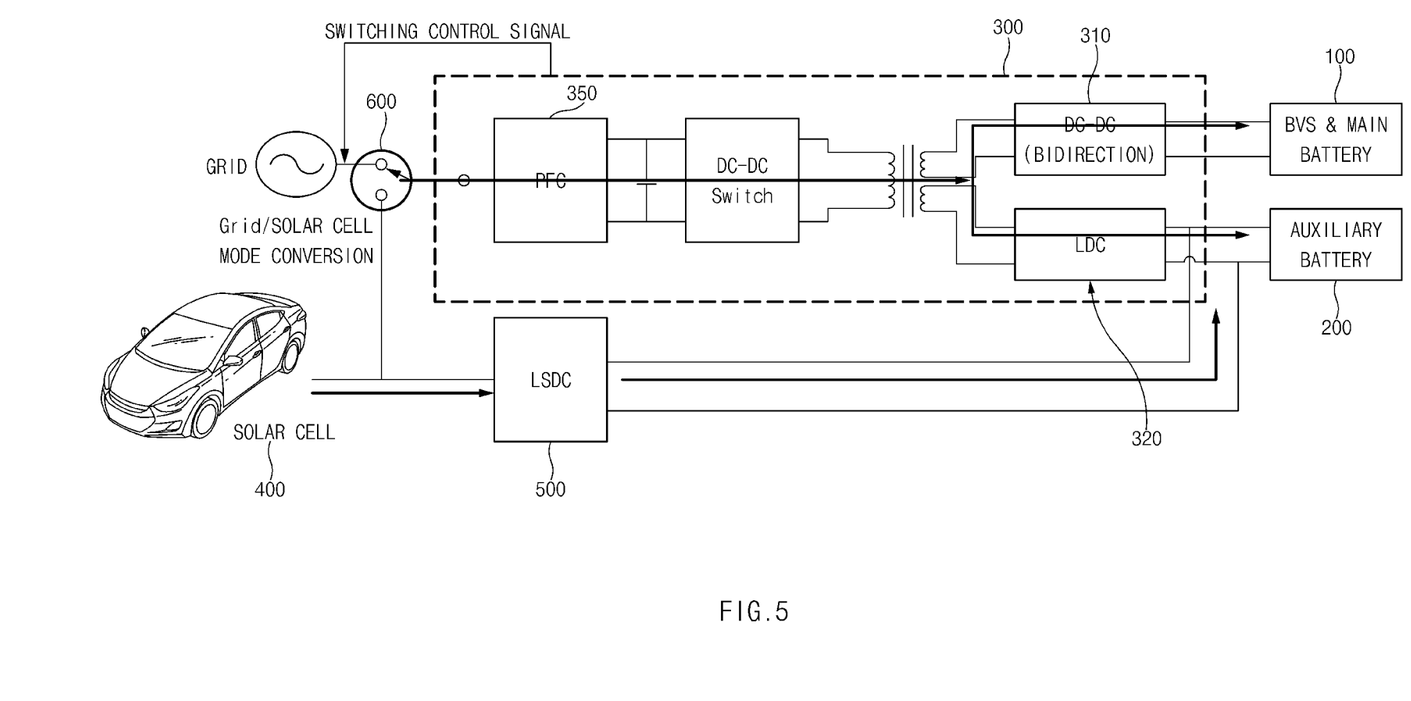
FIG. 5 is a view illustrating a vehicle battery charging system in an on-board charger (OBC) charging mode according to an embodiment of the present disclosure.

FIG. 5 is a view illustrating a vehicle battery charging system in the OBC charging mode according to an embodiment of the present disclosure.

According to an embodiment, in the OBC charging mode in which the auxiliary battery 200 is charged by the integrated converter 300, charging the auxiliary battery 200 independently using the solar cell 400 and charging the main battery 100 and the auxiliary battery 200 using the grid, that is, OBC/LDC charging may be performed.

In the OBC charging mode, the switching device 600 connects the integrated converter 300 and the grid for supplying external power, and the charging current of the solar cell 400 charges only the auxiliary battery 200.

According to the related art, in the OBC charging mode in which the grid is used, although the main battery is also charged using the solar cell, the frequency of utilization is very low when the main battery is actually charged using the solar cell.

For example, the maximum amount of light by the solar cell is about 230 W, and the average load usage of the auxiliary battery is about 230 W, which is almost the same or the load usage is higher in many cases.

Therefore, according to the present embodiment, in the OBC charging mode, the solar cell 400 charges only the auxiliary battery 200 by allowing the switching device 600 to switch to the grid, and when the auxiliary battery is fully charged, the energy loss may be prevented by prohibiting charging through the solar cell 400.

According to an example, the charging amount of the solar cell 400 is a maximum of about 250 W and actually performs an average operation of about 170 W. In the OBC charging mode, the auxiliary battery 200 supplies energy for charging the associated controller, and the solar cell 400 is used to compensate for the charging amount of the auxiliary battery 200 thus consumed.

Figure 6:
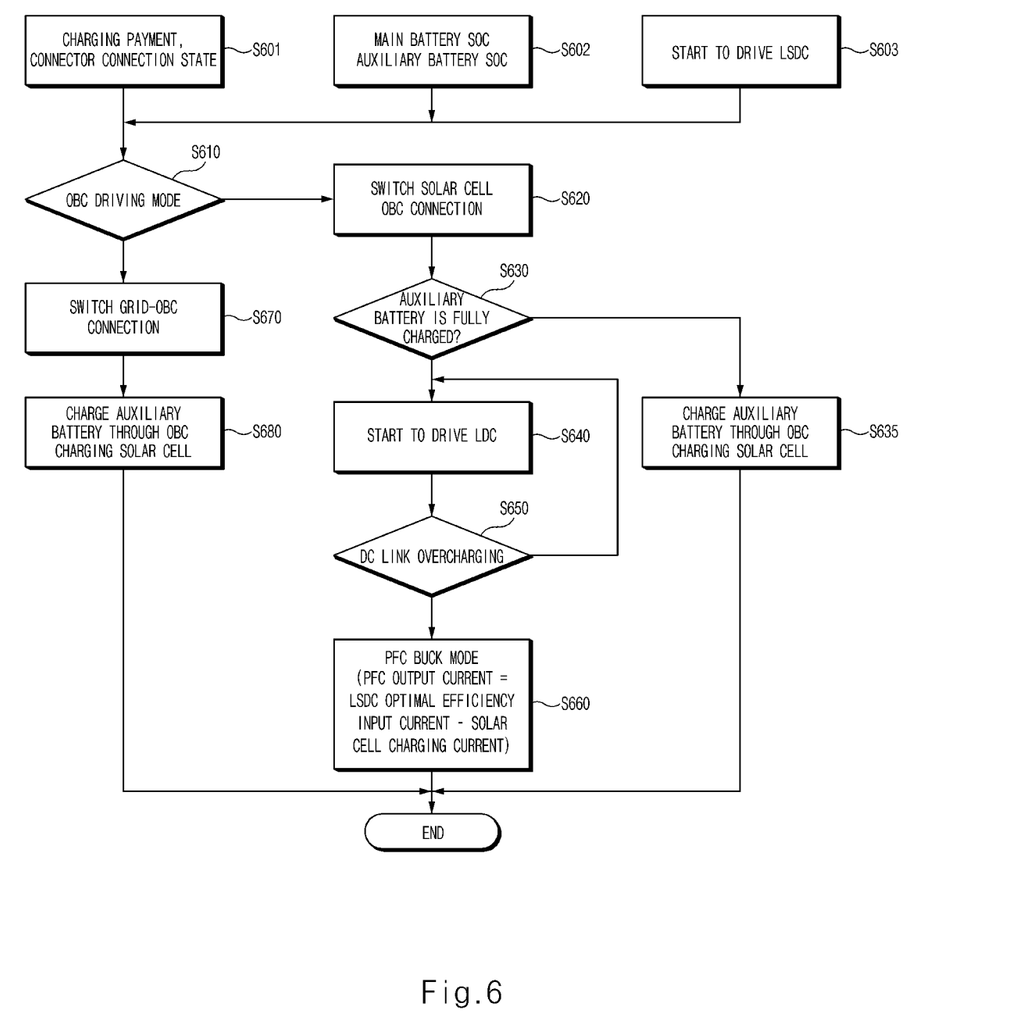
FIG. 6 is a control flowchart illustrating a vehicle battery charging method according to an embodiment of the present disclosure.

FIG. 6 is a control flowchart illustrating a vehicle battery charging method according to an embodiment of the present disclosure.

As shown in FIG. 6, before the control of the vehicle battery charging system, in S601, the connection state of the charger and the connector may be checked, and in S602, the charging states of the main battery 100 and the auxiliary battery 200 may be checked. In addition, the driving of the solar cell converter 500 is started in S603, so that the auxiliary battery 200 is charged.

First, the charging mode of the vehicle battery charging system may be determined. That is, in S610, it may be determined, by a controller, whether the charging mode is a solar cell only charging mode in which the auxiliary battery 200 is charged by the solar cell 400 rather than the integrated converter 300, or an OBC charging mode in which the auxiliary battery 200 is charged by the integrated converter 300.

When the charging mode is the solar cell only charging mode, in S620, the vehicle battery charging system, in particular, the controller may control the switching device 600 to connect the integrated converter 300 and the solar cell 400.

When the switching device 600 connects the integrated converter 300 and the solar cell 400, the current caused by the charging voltage of the high voltage charging device 310 flows to the auxiliary battery 200 through the solar cell converter 500, and in the solar cell only charging mode, it is possible to generate a current flow to the auxiliary battery 200 through the solar cell converter 500 by buck-controlling the PFC device 350.

The charging state of the auxiliary battery 200 may be continuously monitored, and it may also be checked whether the auxiliary battery 200 is fully charged.

When the auxiliary battery 200 is fully charged in operation S630, the PFC device 350 is controlled in a boost control mode, and a current flow is generated to the main battery 100 through the high voltage charging device 310. In addition, the driving of the solar cell converter 500 may be stopped in S635.

Meanwhile, when the auxiliary battery 200 is not in a fully charged state, the low voltage charging device 320 of the integrated converter 300 may be driven in S640.

In this case, the low voltage charging device 320 may be driven through the high voltage charging device 310 for charging the main battery 100. In this case, a transport current may be generated by the inductor resonance phenomenon of the parasitic capacitor of the power converting device 340 and the common transformer, and the charging voltage of the DC link capacitor 360 between the power converting device 340 and the PFC device 350 may be generated by the transport current.

When the DC link capacitor 360 is overcharged in S650, the PFC device 350 may be controlled to be in the buck control mode, and a current flow may be generated through the solar cell converter 500 to the auxiliary battery 200 in S660.

In this case, the current output from the PFC device 350 may be a current obtained by subtracting the charging current of the solar cell 400 from the optimal efficiency input current of the solar cell converter 500.

When the DC link capacitor 360 is not overcharged in S650, the low voltage charging device 320 of the integrated converter 300 may be driven to charge the auxiliary battery in S640.

Meanwhile, when the charging mode is the OBC charging mode rather than the solar cell only charging mode, the switching device 600 may be controlled to connect the integrated converter 300 and the grid for supplying external power in S670, and the charging current of the solar cell 400 may charge the auxiliary battery 200 in S680.

According to the present embodiment, in the OBC charging mode, the charging current of the solar cell 400 may not charge the main battery 100.

As described above, according to the embodiments, it is possible to form a separate conductive path via the LSDC in order to use the power charged in the link capacitor in the LDC only charging mode for charging the low-power battery, that is, the auxiliary battery. In addition, a vehicle battery charging system which is capable of reducing cost and weight by eliminating a relay used to prevent damage to a DC capacitor, and a method using the same are provided.

Figure 7:
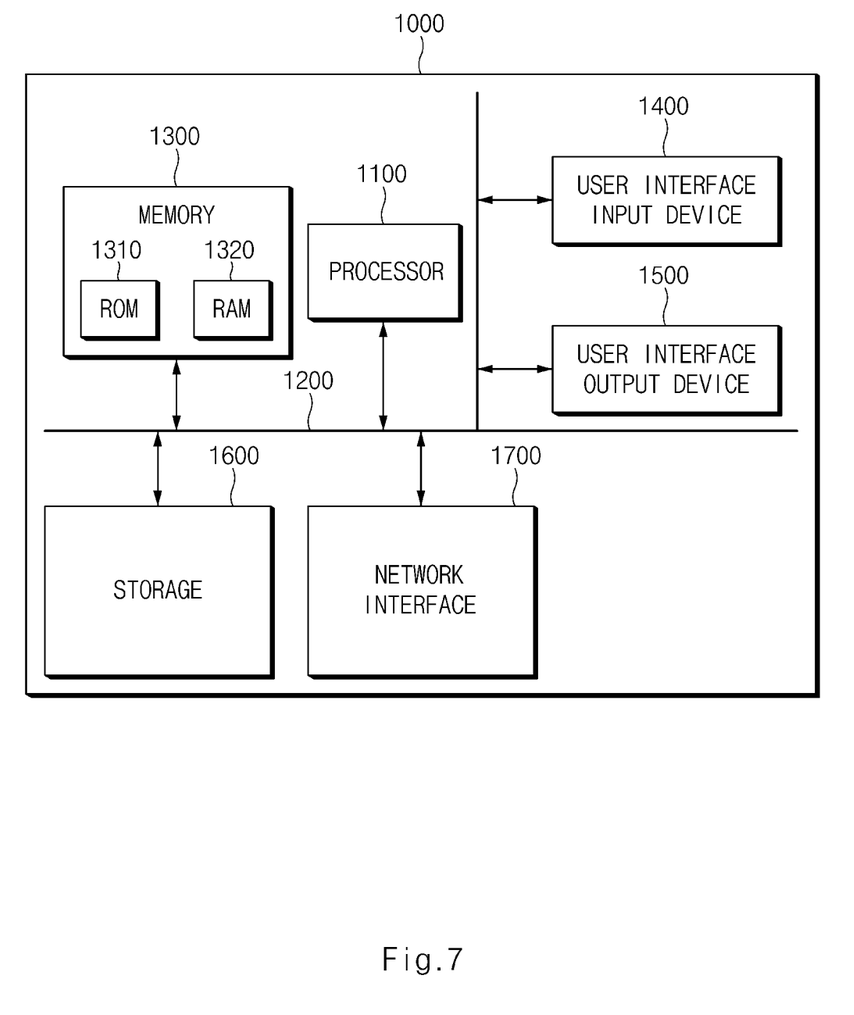
FIG. 7 is a view illustrating a computing system according to an embodiment of the present disclosure.

FIG. 7 is a view illustrating a computing system according to an embodiment of the present disclosure.

Referring to FIG. 7, a computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented in hardware or a software module executed by the processor 1100, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor 1100 and the storage medium may reside in the user terminal as an individual component.

According to an embodiment of the present disclosure, a vehicle battery charging system capable of preventing charging of a link capacitor without degrading OBC efficiency and a method using the same are provided.

According to an embodiment of the present disclosure, a vehicle battery charging system capable of replacing HSDC by using bidirectional OBC and a method using the same are provided.

According to an embodiment of the present disclosure, a vehicle battery charging system for solving a link voltage overcharge problem that may occur due to an integrated transformer structure by utilizing a solar loop power structure, and a method using the same are provided.

In addition, according to the present disclosure, by preventing overcharging of the DC capacitor of the bidirectional OBC without an additional relay, a vehicle battery charging system capable of reducing cost and weight and a method using the same are provided.

In addition, a vehicle battery charging system capable of optimizing solar cell charging converter efficiency and replacing an existing HSDC converter with an integrated OBC and a method using the same are provided.

In addition, various effects that are directly or indirectly understood through the present disclosure may be provided.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A system for charging a vehicle battery, the system comprising:
    a main battery;
    an auxiliary battery;
    an integrated converter including a high voltage charging device configured to supply power to the main battery and a low voltage charging device configured to supply power to the auxiliary battery;
    a solar cell configured to convert sunlight into electrical energy;
    a solar cell converter configured to convert an output of the solar cell into a voltage corresponding to a voltage of the auxiliary battery and output the converted voltage to the auxiliary battery; and
    a switching device configured to switch between the integrated converter and external power and the integrated converter and the solar cell,
    wherein the switching device connects the integrated converter and the solar cell in a solar cell only charging mode in which the auxiliary battery is charged by the solar cell,
    wherein a current, which is caused by a charging voltage of a link capacitor in the integrated converter generated when the auxiliary battery is charged by the high voltage charging device, flows to the auxiliary battery through the solar cell converter when the switching device connects the integrated converter and the solar cell.

2. The system of claim 1, wherein the integrated converter includes:

a power converting device that includes a common transformer and is configured to divide and convert the power input using the common transformer into a first voltage for charging the main battery and a second voltage for charging the auxiliary battery; and a power factor correction (PFC) device configured to correct a power factor of the external power, and wherein the PFC device performs discharge through a buck control when a current flow to the auxiliary battery through the solar cell converter is generated.

3. The system of claim 2, wherein in the solar cell only charging mode, a transport current is generated by an inductor resonance phenomenon of a parasitic capacitor of the power converting device and the common transformer, and the transport current causes a charging voltage of a DC link capacitor between the power converting device and the PFC device.

4. The system of claim 2, wherein a current obtained by subtracting a charging current of the solar cell from an optimal efficiency input current of the solar cell converter is output from the PFC device.

5. The system of claim 2, wherein a charging current of the solar cell is charged into the main battery through the high voltage charging device when the auxiliary battery is fully charged.

6. The system of claim 5, wherein the PFC device is configured to perform charging through a boost control when a current flow to the main battery through the high voltage charging device is generated.

7. The system of claim 1, wherein the switching device is configured to connect the integrated converter and a grid for supplying the external power in an on-board charger (OBC) charging mode in which the auxiliary battery is charged by the integrated converter.

8. The system of claim 7, wherein a charging current of the solar cell is charged into the auxiliary battery in the OBC charging mode.

9. The system of claim 7, wherein a charging current of the solar cell is prevented from being charged into the main battery in the OBC charging mode.

10. A method of charging a vehicle battery of a vehicle battery charging system which includes a main battery, an auxiliary battery, an integrated converter including a high voltage charging device configured to supply power to the main battery and a low voltage charging device configured to supply power to the auxiliary battery, a solar cell configured to convert sunlight into electrical energy, and a switching device configured to switch between the integrated converter and external power and the integrated converter and the solar cell, the method comprising:

determining, by a controller, a charging mode of the vehicle battery charging system; and controlling, by the controller, the switching device to connect the integrated converter and the solar cell when the charging mode is a solar cell only charging mode in which the auxiliary battery is charged by the solar cell, wherein the vehicle battery charging system further includes a solar cell converter configured to convert an output of the solar cell into a voltage corresponding to a voltage of the auxiliary battery and output the converted voltage to the auxiliary battery, and a current, which is caused by a charging voltage of a link capacitor in the integrated converter generated when the auxiliary battery is charged by the high voltage charging device, flows to the auxiliary battery through the solar cell converter when the switching device connects the integrated converter and the solar cell.

11. The method of claim 10, wherein the integrated converter further includes:

a power converting device that includes a common transformer and is configured to divide and convert the power input using the common transformer into a first voltage for charging the main battery and a second voltage for charging the auxiliary battery; and a power factor correction (PFC) device configured to correct a power factor of the external power, and wherein, in the solar cell only charging mode, the PFC device is buck-controlled to generate a current flow to the auxiliary battery through the solar cell converter.

12. The method of claim 11, wherein, in the solar cell only charging mode, a transport current is generated by an inductor resonance phenomenon of a parasitic capacitor of the power converting device and the common transformer, and the transport current causes a charging voltage of a DC link capacitor between the power converting device and the PFC device.

13. The method of claim 11, wherein a current obtained by subtracting a charging current of the solar cell from an optimal efficiency input current of the solar cell converter is output from the PFC device.

14. The method of claim 11, wherein a charging current of the solar cell is charged into the main battery through the high voltage charging device when the auxiliary battery is fully charged.

15. The method of claim 14, wherein the PFC device is boost-controlled to generate a current flow to the main battery through the high voltage charging device when the auxiliary battery is fully charged.

16. The method of claim 10, further comprising:

controlling the switching device to connect the integrated converter and a grid for supplying the external power in an OBC charging mode in which the auxiliary battery is charged by the integrated converter.

17. The method of claim 16, wherein a charging current of the solar cell is charged into the auxiliary battery in the OBC charging mode.

18. The method of claim 16, wherein a charging current of the solar cell is prevented from being charged into the main battery in the OBC charging mode.

* * * * *